June 17, 1952
M. COLLIS
2,600,850
PORTABLE ELECTRIC SAW SHARPENER
Filed Feb. 7, 1949
3 Sheets-Sheet 1
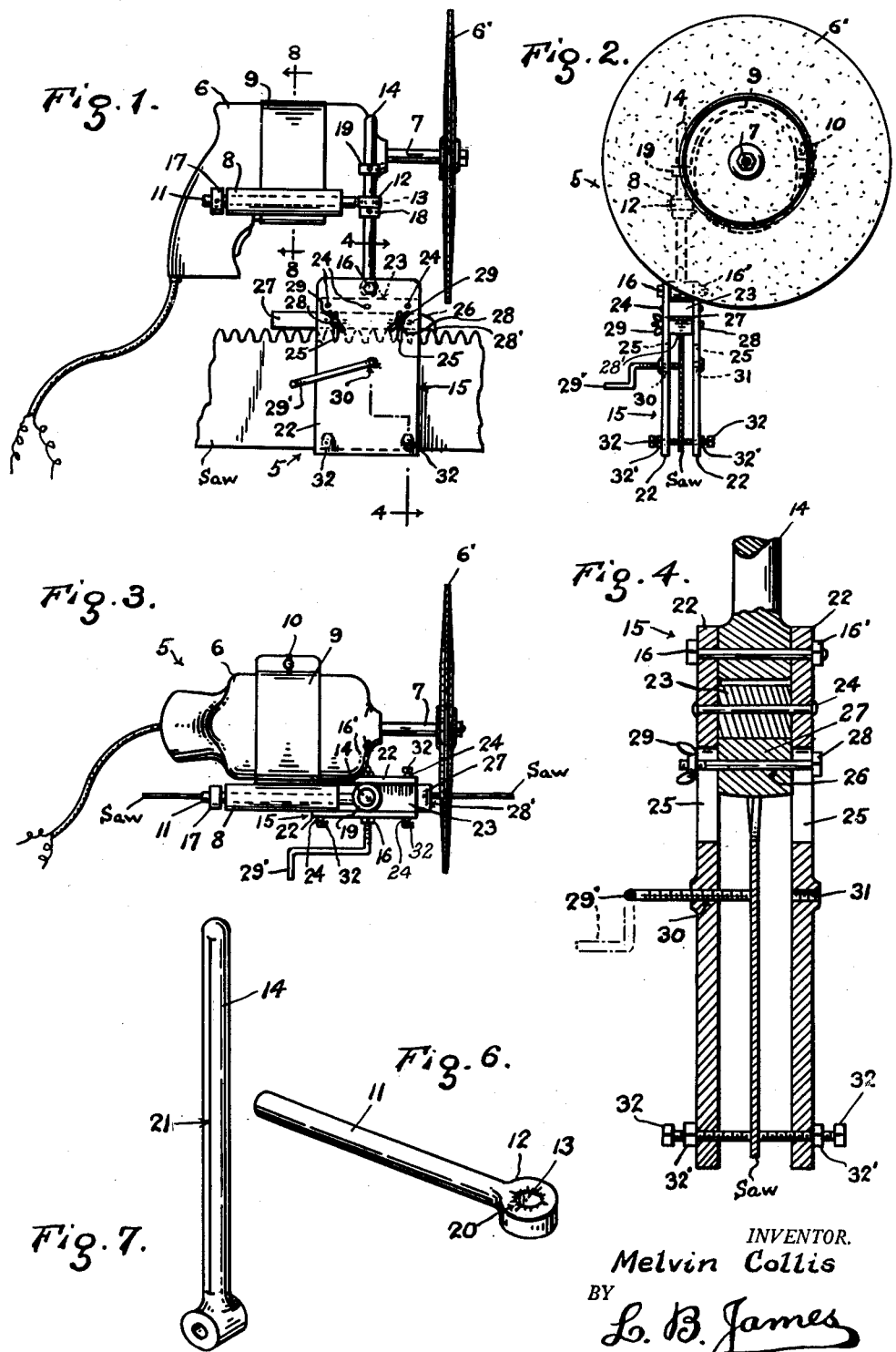
INVENTOR.
Melvin Collis
BY L. B. James
Attorney.

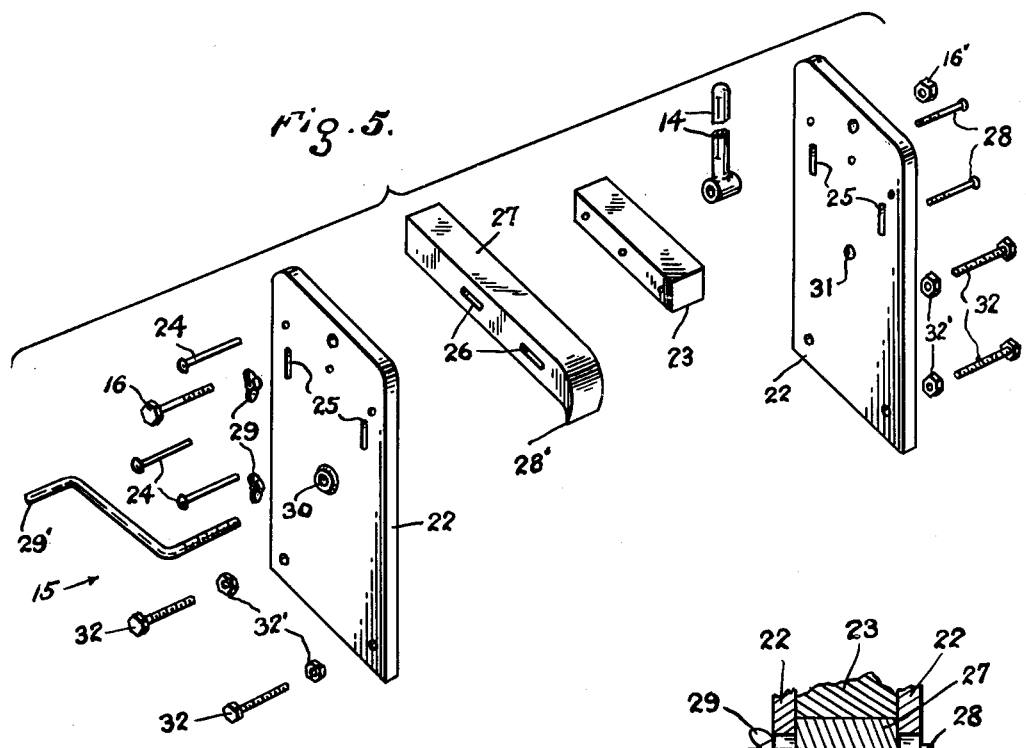
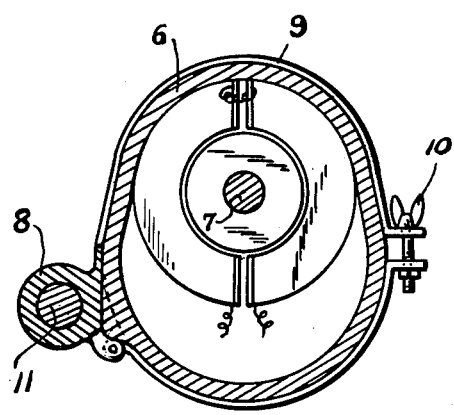
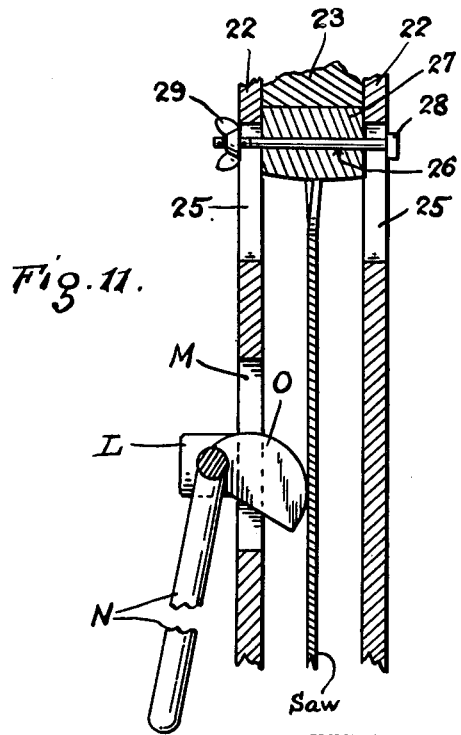

June 17, 1952  M. COLLIS  2,600,850
PORTABLE ELECTRIC SAW SHARPENER
Filed Feb. 7, 1949  3 Sheets-Sheet 3
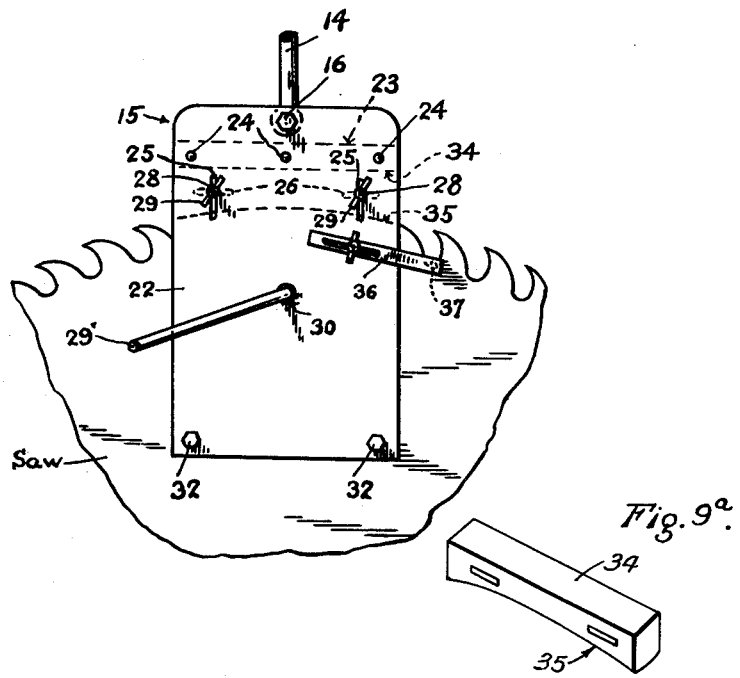
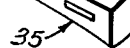
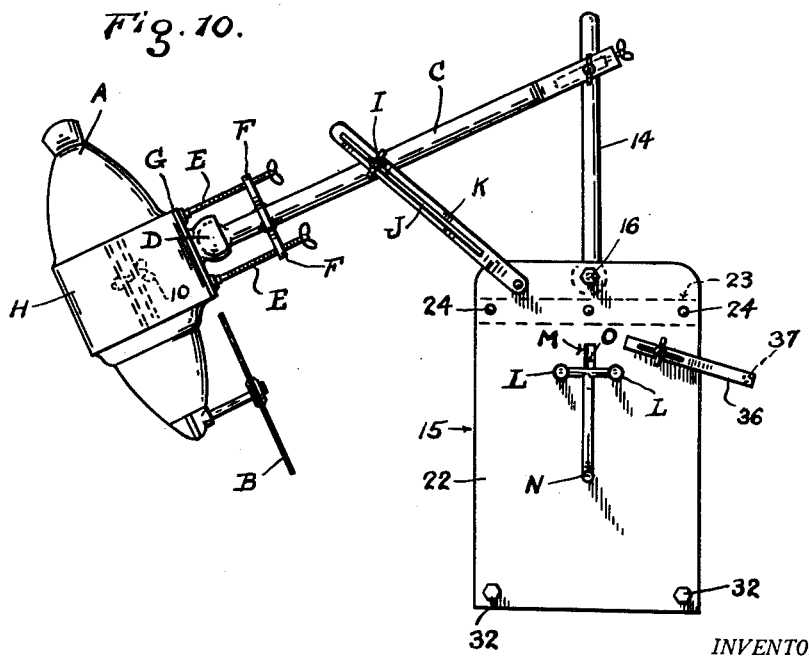
INVENTOR.
Melvin Collis
BY L. B. James
Attorney.

Patented June 17, 1952

2,600,850

UNITED STATES PATENT OFFICE 2,600,850

PORTABLE ELECTRIC SAW SHARPENER

Melvin Collis, Klamath Falls, Oreg.

Application February 7, 1949, Serial No. 74,959

4 Claims. (Cl. 76—40)

This invention relates to a portable electric saw sharpener.

One of the objects of this invention resides in the provision of a portable electric saw sharpener adapted to be removably secured to heavy duty drag and cross-cut saws.

Another object of this invention resides in the provision of a portable electric saw sharpener having a rotary grinding wheel adapted to be freely manipulated so as to precision grind the teeth of various types of saws.

A further object of this invention resides in the particular means for securing a conventional electric grinder to the clamp.

A still further object of this invention resides in the particular construction of the saw sharpener.

One of the salient features of this invention resides in the provision of means whereby the grinding wheel of the sharpener is permitted to be operated at various angles relative to the teeth of a saw.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application,

Fig. 1 is a side view of the saw sharpener secured to a portion of a drag saw.

Fig. 2 is an end view thereof.

Fig. 3 is a plan view of the saw sharpener.

Fig. 4 is a vertical sectional view through the clamp taken approximately on line 4—4 of Fig. 1.

Fig. 5 is a perspective view of the clamp with parts thereof in juxtaposition.

Fig. 6 is a perspective view of the supporting bar of the clamp.

Fig. 7 is a perspective view of the standard.

Fig. 8 is a cross sectional view taken through the body portion of the motor casing taken approximately on line 8—8 of Fig. 1.

Fig. 9 is a side view of the saw sharpener secured to a portion of a disc saw.

Fig. 10 is a side view of a modified form of the saw sharpener.

Fig. 11 is a detail sectional view showing a locking cam between the clamp and saw.

In the present illustration of this invention the numeral 5 designates, in general, a portable electric saw sharpener which, among other elements to be hereinafter set forth, consists of a suitable electric motor 6 having a disc grinder secured to its shaft 7 and provided with an elongated bearing sleeve 8 formed on a wide strap 9 which is removably secured around the electric motor by a suitable fastening bolt 10 so as to dispose said bearing sleeve at one side of the motor with its bore preferably extending in the same direction as the motor shaft.

Slidably disposed in the bore of said elongated bearing sleeve is an elongated guide rod 11 provided with a head 12 having a bore 13 therein to slidably accommodate a standard 14 which is rockably secured at its lower end between upper portions of a clamp 15 by a pivotal bolt 16 or the like. Said guide rod 11 is provided with a removable collar 17 secured to its outer end to prevent it from sliding out of the elongated bearing 8 while the standard 14 is provided with an adjustable bearing collar 18 on which the head 12 of the guide rod 11 rests and thereby supporting the grinder for rotation about the standard and, in order to limit vertical movement of the guide rod on said standard, a collar 19 is adjustably secured to the standard a predetermined distance above the head. Said collars 18 and 19 may be disposed in elected positions on the standard to cause the grinding disc to engage the teeth of a saw at elected angles and, in order that the operator may determine the degree of rotation of the grinder about the standard, a graduated dial 20 or the like is disposed on the upper surface of the head 12 for registration with a mark 21 or the like on the standard, it being within the purview of this invention to substitute any well known indicating device for said dial and mark.

The aforesaid clamp 15 consists of companion plates 22 held in spaced relation by a cross-bar 23 secured therebetween adjacent their upper ends by rivets 24 or the like. Said plates are provided with aligned vertically disposed slots 25 extending below said cross-bar 23 and registering with horizontally disposed slots 26 formed in a brass bar 27 for reception of bolts 28 having thumb-nuts 29 to adjust the clamp relative thereto. The aforesaid brass bar 27 extends laterally between the plates of the clamp and rests on a plurality of teeth of the saw and is provided with a downwardly directed bill 28' at one end for engaging a tooth of the same and thereby resist the tendency of the clamp to slip along the teeth while being ground.

The lower portion of the clamp straddles the upper portion of the saw and is prevented from undue vibration therebetween by a saw engaging clamping lever 29' threaded in either a bore 30 in one plate or a similar bore 31 in the opposite plate and in order to rigidly secure the clamp on the saw, jam-bolts 32 are threaded through opposite plates, preferably at their lower corners, with their inner ends bearing against the saw. In order to prevent the jam-bolts from unscrewing and thereby loosen the clamp on the saw, lock-nuts 32' are threaded on their outer portions and tightened against the outer surfaces of the plates.

In Fig. 9 of the drawings the clamp is provided with a brass bar 34 adapted to be adjusted in a manner similar to that of the brass bar 27 but is provided with an arcuate lower surface 35 to rest on certain teeth of a disc saw and, as a substitute for the bill 28 of the lower bar 27, an arm 36 having a right angularly extending bronze finger 37 on its outer end for engaging the edge of one of the teeth of the saw is adjustably secured to an elected side of the clamp.

In Fig. 10 of the drawings an electric motor A having a grinding disc B disposed at right angles to its drive shaft is connected to the outer end of an elongated rod C by a ball and socket joint D and is retained in elected positions relative to said rod by thumb-screws E threaded through arms F on the rod with their outer ends bearing against a plate G formed on a motor surrounding strap H. Said elongated rod is locked at elected angles to the standard by a thumb-bolt I threaded therein and extending through an elongated slot J formed in an arm K pivoted at its inner end to the clamp.

In Fig. 11 of the drawings, one or both of the clamping plates of the clamp is provided with pillars L on opposite sides of a slot M to pivotally support a lever N having a cam O extending through the slot to prevent undue vibration thereof between the clamping plates, it being apparent that the jam-bolts 32 are also used as heretofore set forth.

With this invention fully set forth, it is manifest that means are provided whereby conventional electrical hand grinders may be employed to perform precision operations on the teeth of various types of saws and through the simplicity of the elements involved, the cost of manufacture thereof will be nominal.

Having thus described my invention, what I claim and desire to protect by Letters Patent is:

1. The combination with a clamp straddling a portion of the toothed edge of a saw, a brass bar adjustably connected to the clamp and bearing on the outer edges of the teeth of the saw, a bill formed on one end of the brass bar and overlying the outer end of a tooth of the saw, a saw engaging lever threaded through the clamp with its end bearing against the saw adjacent the base of the teeth thereof, clamp bolts threaded in the clamp adjacent its opposite corners with their inner ends bearing against the saw, lock nuts securing the jam nuts in locked position relative to the clamp, a standard pivotally mounted on the upper end of the clamp, a bearing collar adjustably disposed on the standard, a rod slidably and rotatably resting on said bearing, a sleeve slidably mounted on said rod, a collar secured to the outer end of the rod, an electric motor including a rotary disc sharpener, a band formed on said sleeve and surrounding the motor, means securing said band around the motor, a dial secured on the aforesaid bearing and having graduations thereon registering with a mark on the standard, and an adjustable collar secured to the standard a predetermined distance from said rod.

2. The combination with a clamp straddling a portion of the toothed edge of a saw, means securing the clamp to the saw, a brass bearing plate adjustably secured to the clamp and having a lower surface conforming to the working edge of the saw, a standard pivoted to the upper end of the clamp, a rod hingedly and adjustably connected to the standard, an electric motor including a grinding disc operated thereby at right angles to its drive shaft, a band removably secured around the electric motor, a plate secured to the band, a ball and socket joint connecting the rod to the plate, arms formed on the rod on opposite sides of the ball and socket joint, thumb screws threaded through said arms with their outer ends bearing against said plate, a slotted rod pivoted to the clamp, and a thumb screw passing through the slot in said arm with its inner end threaded into the rod to lock it in adjusted positions relative to the standard.

3. The combination with a clamp straddling a portion of the working edge of a saw, a brass bar adjustably connected to the clamp and bearing on the teeth of the saw, spaced pillars formed on the sides of the clamp on opposite sides of a slot therein, a rod pivoted in said pillars, a cam formed on said rod and extending through the slot between the pillars with its inner edge bearing against the side of the saw, a lever formed on the cam, a standard pivoted to the clamp, and a motor grinder mounted on the standard for circumferential and axial movement thereon.

4. The combination with a portable electric hand saw sharpener, a clamp including elongated companion side plates disposed in spaced parallelism and rigidly secured together inwardly of their upper ends, a bearing bar secured between the companion plates below their secured portions, opposed jam-bolts threaded through laterally spaced apertures in the lower portions of the companion plates, an elongated standard pivoted between the companion plates above their secured portions for swinging sidewise relative to the plates, saw engaging means supported by certain of the companion plates at a point remote from said jam-bolts for limiting undue vibration of a saw clamped between said plates, and means adjustably connecting the sharpener on the standard.

MELVIN COLLIS.

REFERENCES CITED

The following references are of record in the file of this patent:

UNITED STATES PATENTS

| Number | Name | Date |
|---|---|---|
| 409,866 | Penrose | Aug. 27, 1889 |
| 570,225 | Myers | Oct. 27, 1896 |
| 879,962 | Hawkins | Feb. 25, 1908 |
| 976,091 | Miller | Nov. 15, 1910 |
| 1,942,016 | Andrus | Jan. 2, 1934 |
| 2,249,743 | Bucknam | July 22, 1941 |
| 2,439,279 | Andrus | Apr. 6, 1948 |